Aug. 8, 1933.  D. HEAD  1,921,122
STEERING GEAR MECHANISM
Filed May 8, 1933   2 Sheets-Sheet 1
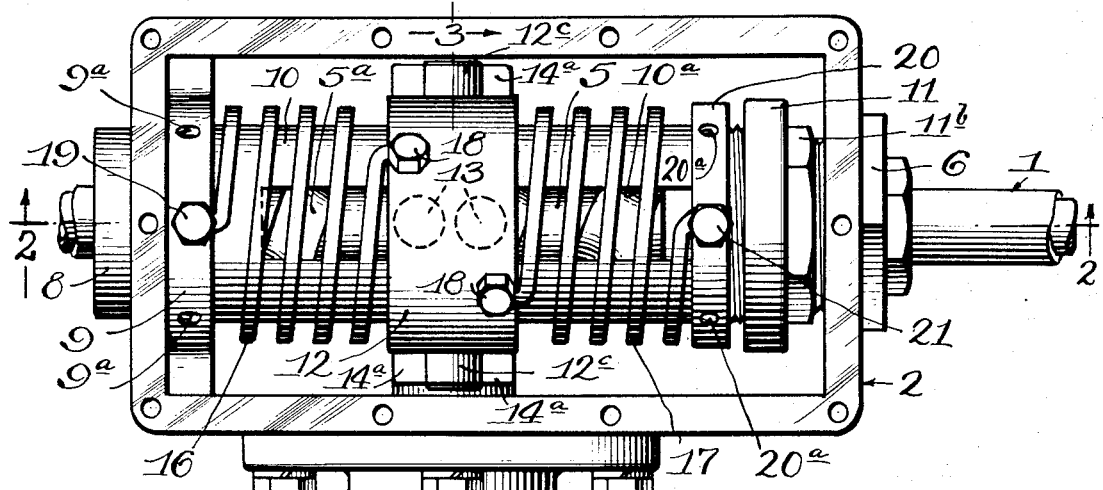
Fig.1
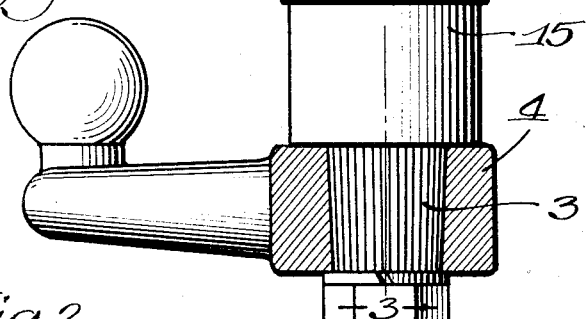
Fig.2
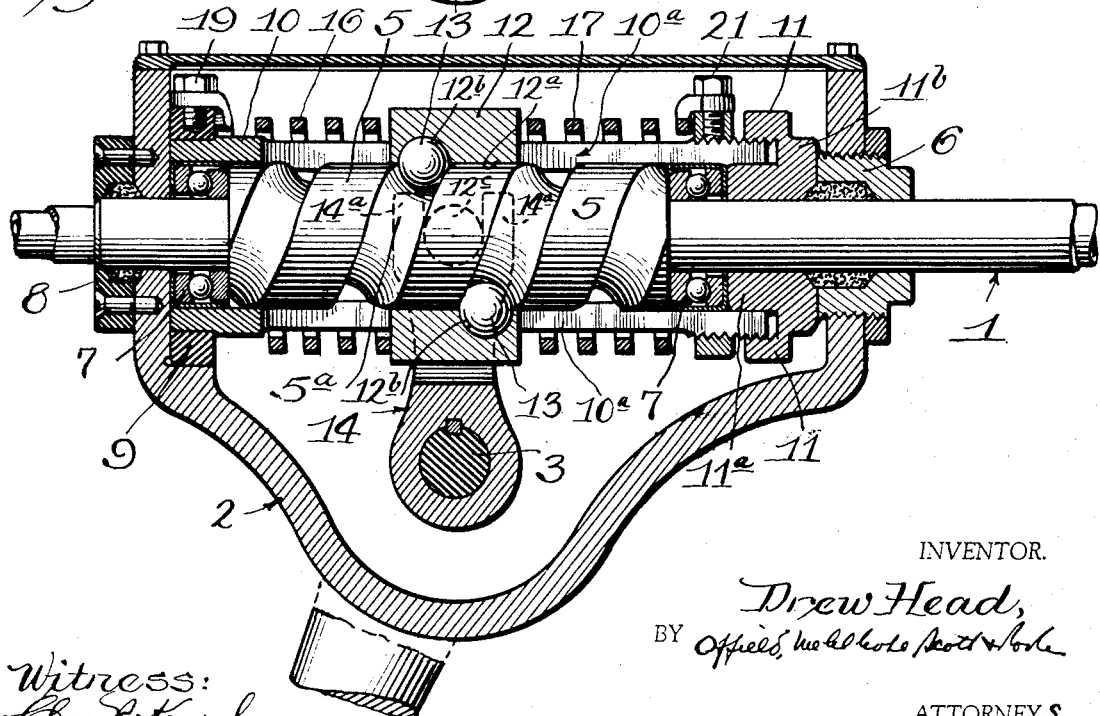
INVENTOR.
Drew Head,
BY
ATTORNEYS.
Witness:

Aug. 8, 1933.                    D. HEAD                    1,921,122
                         STEERING GEAR MECHANISM
                        Filed May 8, 1933          2 Sheets-Sheet 2
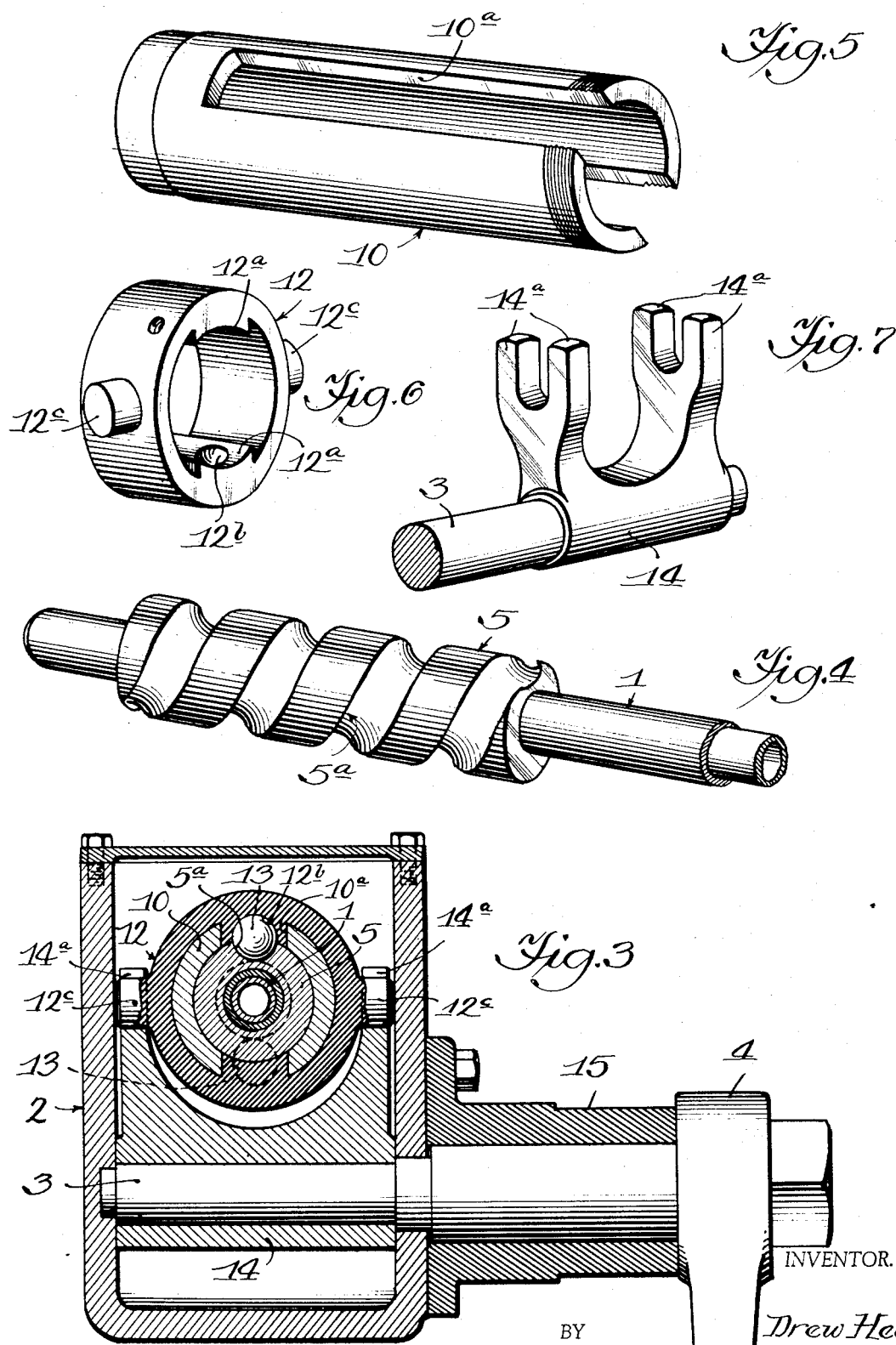

Patented Aug. 8, 1933

1,921,122

UNITED STATES PATENT OFFICE 1,921,122

STEERING GEAR MECHANISM

Drew Head, Chicago, Ill.

Application May 8, 1933. Serial No. 669,869

11 Claims. (Cl. 74—79)

This invention relates to improvements in steering gear mechanism for motor vehicles, and more particularly to the mechanism for reducing the axial rotation of the steering wheel shaft to an oscillating or rocking motion of an arm operatively connected with the front or steering wheels.

The object of the invention is to improve certain features upon the more common types of steering gears, and particularly with regard to ease of manipulation, elimination of vibration, absorption of road shocks and the substantial increase in the bearing areas between moving parts, thereby reducing wear and necessity for periodic adjustment.

In common with all standard types of steering gear mechanisms, the essential characteristic of the herein disclosed mechanism is non-reversibility, that is, the ability to transmit the turning motion to the front wheels without permitting external forces acting on the wheels to be transmitted back through the gear to the steering wheel. To this end, most steering gears embody some variation of the worm drive, recognized as the most efficient non-reversible mechanical movement, although in practice non-reversibility is only achieved in a degree.

Reduced to its essentials, non-reversibility is a matter of gear ratio, that is, the arc through which the steering wheel is turned in order to shift the front wheels in a given turning radius. Thus the greater the gear ratio, the greater the degree of non-reversibility, and vice versa. However, in the design of steering gears it is necessary to sacrifice a degree of non-reversibility for easy steering, and hence a gear ratio is selected, such that a maximum of non-reversibility is obtained with a minimum of effort and turning of the steering wheel. Manifestly then the nearer these factors of steering safety and ease of steering approach 100%, the more efficient the steering gear and to accomplish this result is another object of the present invention, namely, to reduce the amount of turning or "wind-up" of the steering wheel required to swing the wheels through a given turning radius without increasing the effort required or decreasing the degree of non-reversibility.

A preferred embodiment of the invention is disclosed in the accompanying drawings, in which Figure 1 is a top plan view of the steering mechanism with the top of the casing removed;

Figure 2 is a view in vertical section as taken on line 2—2 of Figure 1;

Figure 3 is a view in cross section as taken on line 3—3 of Figure 2;

Figure 4 is a perspective view of the grooved cylinder;

Figure 5 is a perspective view of the bearing sleeve;

Figure 6 is a perspective view of the sliding collar; and

Figure 7 is a perspective view of the yoke.

Inasmuch as the steering mechanism herein illustrated does not depart from the standard design except as to the mechanical movement between the steering shaft and rocker arm, only these parts have been completely shown. Thus the steering shaft 1 with its wheel (not shown) finds its counterpart in any steering column assembly for a motor vehicle, as does also the gear casing 2 fixed to the side frame member of the chassis and having a rock shaft 3 projecting transversely therefrom with a depending rocker arm 4 mounted on its outer end. The rocker arm is connected with the steering knuckles by the standard arrangement of drag link and cross link.

Referring now to the mechanism within the gear casing 3 which is elongated in a direction axially of the steering wheel shaft 1, there is journalled centrally of this casing a cylindric worm-like member 5 directly connected with the lower end of the steering wheel shaft 1, which extends through a stuffing box or gland 6 fitted into the upper end of the casing. The steering shaft preferably extends through and beyond the lower end of the cylinder 5 and is journalled in ball bearings 7, 7 mounted just beyond the ends of the worm, the end of the shaft projecting through gland 8 in the lower end of the casing.

On the surface of worm 5 is cut a single helical cam groove 5ª of a half-round sectional contour extending from end to end thereof. The length of the worm is about 3½ inches and the pitch of the groove is somewhere in the neighborhood of 12°, although this is not fixed, as will later be pointed out.

Surrounding the worm 5 is a slotted bearing sleeve 10 extending substantially the full length of the casing and suitably anchored therein against rotation as by means of a fixed bearing bracket 9 having a collar into which the lower end of the sleeve is fitted. The bracket is suitably anchored in the end of the casing and the end of the sleeve locked in the bracket. The sleeve is slotted from a point inwardly from its lower end to its upper end (Figure 5), these slots 10ª, 10ª being diametrically opposed to each other and of considerable width, say, ¾ of an inch. The upper or split end of the sleeve is externally threaded to engage an internally threaded bearing collar 11 mounted on the shaft 1 between the upper ball bearing 7 and the gland nut 6, said bearing collar having a central boss 11a extending endwise a short distance into the end of the sleeve and abutting against the ball bearing 7 as shown in Figure 2. This bearing collar has a hexagonal portion 11b at its outer end to receive a spanner wrench for making any necessary adjustments.

Mounted on the sleeve 10 is a sliding collar 12 having internally projecting lugs 12a adapted to fit within the slots 10a in the sleeve with their inwardly facing surfaces flush with the surface of the worm 5, their circumferential width being equal to that of the slots 10a so that there is no looseness between the collar and the sleeve. Each lug 12a carries a steel ball 13 turning freely within a semi-spherical recess or cavity 12b formed in its inner face (Figure 6), each ball thus projecting from the inner face of the lug and engaging the helical groove 5a of the worm 5 at points diametrically opposed to each other, although to allow for the pitch of the helical groove it is necessary to offset the position of the balls 13, 13 lengthwise, that is, toward opposite ends of the lugs. The collar is of adequate width to provide for this offsetting of the steel balls. On the exterior of the collar are two radial pins 12c, 12c located so that they extend laterally in a horizontal direction from points diametrically opposed to each other. The pins engage the forked ends 14a of a yoke 14 which straddles the collar and is fixed to the rock shaft 3 extending transversely of the casing below the gearing assembly, said rock shaft being suitably journalled in an outboard bearing 15 bolted to the side of the casing and carrying the rocker arm 4 at its end as heretofore explained.

To complete the assembly, two relatively heavy coil springs 16 and 17 are introduced between the sliding collar 12 and the ends of the bearing sleeve 10, the inner end of each spring being suitably attached to the collar as by means of a screw 18 anchored in its outer face and passing through a loop at the end of the spring. Their outer ends are similarly anchored to some fixed point of the assembly. Thus the stationary bracket 9 which retains the lower end of the sleeve 10 is tapped on its upper face as at 9a, and a screw 19 is inserted as an anchor for the looped outer end of the lower spring 16. The extreme end of the upper spring 17 is preferably anchored to a separate screw collar 20 mounted on the threaded end of the sleeve 10 inwardly from the bearing collar 11, the purpose of the screw collar being to provide an independent anchorage for the spring, inasmuch as the bearing collar is capable of rotation for purposes of adjustment, and hence the spring could not be anchored thereto without applying torsion to the spring. Thus the screw collar 19 is fixed to the sleeve, and a screw 21 tapped into the collar at the point to receive the looped end of the spring. A set screw or other means may be used for locking the screw collar 20 to the sleeve 10 after it has been assembled thereon.

In order to allow for the adjustment of the springs 16 and 17 during the assembly operation, the bracket 9 and screw collar 20 are preferably tapped at more than one point for the anchor screws 19 and 21, namely, at points spaced apart at intervals about the peripheral faces of these members as at 9a and 20a. In this way the springs may be anchored at the outer ends without distorting them.

The springs 16 and 17 are both compression and tension springs, that is, each acts on the sliding collar 12 to resist its sliding movement either by tension or compression, depending on whether the collar is on one side or the other of its center position on the sleeve, as illustrated in Figure 1. To explain further: It is apparent that when the collar 10 is in its center position, that is, the position for straight ahead driving, both springs are under compression and both are exerting the same force against the collar and in opposite directions. Now if the collar travels in either direction from its center position as it will when the steering shaft is turned, the spring on the side toward which the collar slides exerts a greater resistance to the movement of the collar by its increased compression, while the spring on the opposite side exerts a tensional resistance, the combined compression and tension increasing as the collar approaches the extreme limits of its travel. The function of this spring action will be brought out in greater detail in the following discussion of the operation of the mechanism.

It is perhaps obvious that the rotation of the steering wheel shaft imparts a sliding movement to the collar 12 through the action of the balls 13, 13 riding or rolling within the cam groove of the worm 9, thus converting a rotative movement into a linear movement, which in turn is converted into a rocking movement of the rocker arm 4 through the engagement of the ends of the yoke 14 with the pins 12a on the collar. As a mechanical movement, the assembly is not particularly intricate, although its advantages as a practical steering gear will permit of elaboration.

The more commonly used steering gears employ either the worm and gear sector or the worm and arm type of the drive, in which the movement of the rocker arm results from a direct driving connection from the worm to the rock shaft, either through a sector meshing with the worm or an arm having a projection engaging the groove of the worm. In either case the power is transmitted directly from one to the other and through the limited bearing area approaching a tooth to tooth contact, with the result that the wear and consequent lost motion that invariably develops has to be taken up by frequent adjustments.

In the present construction, the sliding collar 12 affords an intermediate driving connection between the worm and the rock shaft, to the end that the rotation of the steering wheel shaft is first converted into the reciprocating sliding motion of the collar axially on the bearing sleeve, and then the conversion of this reciprocating motion to the rocking motion of the rock shaft through the pin and slot connection of the collar with the yoke 14.

By this arrangement the gear reduction is accomplished in two steps instead of one, with the result that the force applied at the steering wheel is distributed evenly over bearing surfaces of considerable area, to mention particularly that of the sliding collar 12 on the sleeve 10, and the rolling action of the steel balls carried by the former in the helical cam groove of uniform pitch and relatively small angle of lead, all of which contributes to the reduction of frictional resistance, easy steering and elimination of wear.

Another advantage of this steering gear design is in the matter of dampening and thus minimizing the effect of road shocks and vibrations that are transmitted back through the steering gear, when the wheels travel over rough roads or encounter obstructions tending to swing the wheels from their true line of steering, and cause what is termed "back-lash".

In the ordinary type of steering gear the back-lash is more difficult to eliminate, because there is no intermediate member between the rock shaft and the steering shaft to absorb or check the reverse action. In the present construction the sliding collar 12 receives the immediate effect of any back-lash transmitted to the rock shaft, and by virtue of its large bearing contact on the sleeve it is largely distributed and absorbed before reaching the steering shaft. And in this connection the springs 16, 16 play an important part in dampening all vibrations and shocks transmitted back toward the steering wheel, thus serving as cushioning members for the purpose, as well as resisting those forces which tend to cause reversibility and which otherwise would be compensated for in a greater gear reduction between the steering wheel and the rock shaft. Consequently in designing the steering gear mechanism for any given make or weight of vehicle, much greater latitude is afforded in reducing the turning or "wind-up" of the steering wheel required to swing the wheels through their maximum turning radius.

Thus if it be assumed that the full turning radius of the wheels is represented by a swing of 70° of the rocker arm 4, the wind-up of the steering wheel may be brought down to, say, 1½ turns or 540°, that is, a ratio as low as 8 to 1 as compared with a ratio of from 11 to 1, or 15 to 1, which is average for most types of steering gears in use, which means from 2 to 3 turns of the steering wheel for the full turning radius of the front wheels. This ratio is primarily dependent upon the pitch of the work which can be varied somewhat in working out the details for a given unit so as to maintain a nice balance between easy and effortless steering and safe operation.

Having set forth a full and complete embodiment of my invention, I claim:

1. A steering gear comprising a steering shaft, a worm on said steering shaft, a fixed sleeve surrounding said worm and having a longitudinal slot, a collar slidably mounted on said sleeve and having a portion projecting through the slot in said sleeve and having driving engagement with said worm, and a rock shaft operatively connected with said collar.

2. A steering gear comprising a steering shaft having a worm, a fixed bearing sleeve surrounding said worm and having longitudinal slots extending the length of said worm, a collar slidably mounted on said sleeve and operatively connected with said worm through the slots in said sleeve, and a rock shaft extending transversely of said steering shaft and operatively connected with said collar.

3. A steering gear comprising a steering shaft having a worm, a fixed bearing sleeve surrounding said worm and having longitudinal slots extending the length of said worm, a collar slidably mounted on said sleeve and provided with lugs sliding within said slots and having driving engagement with said worm, a rock shaft extending transversely of said steering shaft, a yoke mounted on said rock shaft and operatively connected with said collar, and a rocker arm carried by said rock shaft.

4. A steering gear comprising a steering wheel and shaft, a worm at the lower end of said steering shaft, a casing enclosing said worm and the lower end of said shaft, a bearing sleeve surrounding said worm and non-rotatably supported at its ends in said casing, a collar slidably mounted on said bearing sleeve, the latter being provided with diametrically opposed slots extending lengthwise of said worm and said collar provided with lugs fitting within said slots and meshing with said worm, a rock shaft journalled in said casing and including a yoke straddling said collar and having a pin and slot connection therewith, and a rocker arm mounted on said rock shaft.

5. A steering gear comprising a steering wheel and shaft, a worm at the lower end of said steering shaft, a casing enclosing said worm and the lower end of said shaft, a bearing sleeve surrounding said worm and non-rotatably supported at its ends in said casing, a collar slidably mounted on said bearing sleeve, the latter being provided with diametrically opposed slots extending lengthwise of said worm and said collar provided with lugs fitting within said slots and worm engaging members projecting from the inner faces of said lugs, a rock shaft journalled in said casing and extending therefrom transversely of said steering shaft, a yoke mounted on said rock shaft and straddling said collar, said yoke and collar being connected by pin and slot connection, and a rocker arm mounted on the outer end of said rock shaft.

6. A steering gear comprising a steering shaft having a worm, a fixed bearing sleeve surrounding said worm and provided with a longitudinal slot, a collar mounted on said sleeve to slide lengthwise thereof and having worm engaging members extending through said slots, a coil spring surrounding said sleeve and acting on said collar to oppose its sliding movement on said sleeve, a rocker arm and means for transmitting the endwise movement of said collar to said rocker arm.

7. A steering gear comprising a steering shaft having a worm, a fixed bearing sleeve surrounding said worm and provided with a longitudinal slot, a collar mounted on said sleeve to slide lengthwise thereof and having worm engaging members extending through said slots, a coil spring surrounding said sleeve and fixed at one end to said collar and at its other end at a fixed point adjacent one end of said sleeve, a rocker arm and means for transmitting the endwise movement of said collar to said rocker arm.

8. A steering gear comprising a steering shaft having a worm, a fixed bearing sleeve surrounding said worm and provided with a longitudinal slot, a collar mounted on said sleeve to slide lengthwise thereof and having operative connection with said worm through said slot, a pair of coil springs surrounding said sleeve on opposite sides of said collar, the inner ends of said springs being fixed to said collar and their outer ends at the ends of said sleeve, a rock shaft extending transversely of said steering shaft and carrying a rocker arm and a yoke mounted on said rock shaft and operatively connected with said collar.

9. A steering gear comprising a steering shaft having a steering wheel at one end and a worm at its lower end having a helical cam groove of a uniform pitch, a casing enclosing the lower end of said shaft with its worm, a longitudinally slotted bearing sleeve surrounding said worm and having fixed bearing at the ends of said casing, a collar slidably mounted on said sleeve and provided with internally projecting lugs engaging said slots and the groove of said worm, tension and compression members acting on said collar to oppose its sliding movement on said sleeve, a rock shaft journalled in said casing transversely of said steering shaft and having a yoke straddling said collar with its ends engaging pins projecting radially from said collar and a rocker arm mounted on said rock shaft.

10. A steering gear comprising a casing, a steering shaft journalled at its lower end in said casing and having a cylindric portion within said casing, with a helical groove of uniform pitch extending the length of a fixed sleeve surrounding said grooved portion of the shaft and non-rotatively mounted at its ends in said casing, a collar slidably mounted on said sleeve and provided with a pair of diametrically opposed lugs engaging longitudinal slots in said sleeve and said groove, a coil spring surrounding said sleeve and divided into sections positioned on opposite sides of said collar, the inner ends of said sections being fixed to said collar and their outer ends fixed at the ends of said casing, whereby said collar is shifted against the combined compression and tension of said spring sections in the rotation of said steering shaft, a rock shaft extending transversely of said steering shaft and carrying a rocker arm and a yoke mounted on said rock shaft and operatively connected with said collar.

11. A steering gear comprising a steering shaft having a steering wheel at one end and a worm at its lower end having a helical cam groove of a uniform pitch, a casing enclosing the lower end of said shaft with its worm, a longitudinally slotted bearing sleeve surrounding said worm and having fixed bearing in said casing, a collar slidably mounted on said sleeve and provided with internally projecting lugs engaging said slots and balls recessed into the inner faces of said lugs and engaging said cam groove on opposite sides of said worm, a rock shaft journalled in said casing transversely of said steering shaft and having a yoke straddling said collar with its ends engaging pins projecting radially from said collar and a rocker arm mounted on said rock shaft.

DREW HEAD.